UNITED STATES PATENT OFFICE.

FRANCIS X. GOVERS, OF OWEGO, NEW YORK.

PAINT-REMOVER AND PROCESS OF MAKING THE SAME.

No. 885,151.　　　　Specification of Letters Patent.　　Patented April 21, 1908.

Application filed October 28, 1907. Serial No. 399,551.

*To all whom it may concern:*

Be it known that I, FRANCIS X. GOVERS, a citizen of the United States, residing at Owego, in the county of Tioga and State of New York, have invented certain new and useful Paint-Removers and Processes of Making the Same; and I do hereby declare the following to be a full, clear, and exact description of the same, such as will enable others skilled in the art to which it appertains to make and use the same.

This invention relates to paint removers and processes of making the same, and consists in a paint and varnish remover comprising a phenol derivative or derivatives combined with thickening means, and, when desired, with one or more other paint and varnish softening or removing substances, as hereinafter mentioned; and my invention also consists in the process of making such phenol derivative or derivatives and of making a paint or varnish remover comprising such derivative or derivatives; all as more fully set forth hereinafter and as claimed.

Phenols and their derivatives, and particularly cresol and its derivatives, have to a marked degree the power of softening or disintegrating paint and varnish. Phenol and cresol themselves, notwithstanding their possession of this quality, are not well suited for use in paint removers, because they are somewhat corrosive to the hands, because they are too thin or liquid, and because of their strong characteristic odors, which are very clinging and permanent in their nature. I have discovered, however, that certain derivatives of phenol and cresol, and particularly those hereinafter mentioned, are practically free from the objectionable qualities noted, are not corrosive in their nature, having none of the characteristic phenol or cresol odor, (the odor which they do have being faint and pleasant in character), and being capable of being thickened by suitable thickening means to a consistency which makes it convenient to apply them and which insures their remaining for a sufficient length of time on vertical surfaces. These derivatives may be used with or without admixture of other solvent or paint softening or disintegrating substances.

The phenol or cresol derivatives which form particularly the subject-matter of the present invention, may be made by the action of a strong mineral acid on a mixture of a salt of an organic acid (as hereinafter described) with the phenol (using the term in its broad sense) to be used. The crude product of this reaction of course comprises, besides the said phenol derivative or ester, other reaction products, for example, a salt of the mineral acid used and of the base of the organic-acid salt used; and the desired phenol derivatives may of course, be extracted from the other reaction products and used separately therefrom. But for many purposes such separation is not necessary and is not even desirable, such other reaction products serving to give the mass the desired consistency or thickness, and according to the invention as claimed herein the phenol derivative is not separated from the salt constituting the main other reaction product, the latter being retained to give the desired body or consistency.

The process of the present case comprises, in brief, in its most specific embodiment, heating cresol (commercial cresylic acid) with calcium acetate in about the amounts theoretically required for complete combination (the calcium acetate may be a little in excess) and the addition of sulfuric acid in proportion somewhat less than that equivalent to the calcium acetate (so as to have no free sulfuric acid in the resulting product). This results in a product which is a thickish mass, which ordinarily when made with white acetate (free from tar) is whitish or pinkish in color, and has about the consistency of a thick paste; a consistency which enables it to be spread well in efficient layers on any surface, whether horizontal, inclined or vertical. The mass is sufficiently thick so that, if desired, considerable proportions of other solvents or paint or varnish softeners or disintegrators may be added without making it too thin to remain in place on vertical or inclined surfaces. This pasty mass comprises, as its main ingredients, cresyl acetate, calcium sulfate, and water. It contains nothing of an inflammable or readily combustible, or of an explosive nature, nor anything subject to decomposition or deterioration with lapse of time, and is therefore a very suitable substance to be packaged in its described condition, for retail sale, to be used, when required, either by itself or in mixture with other solvents, softeners or disintegrators.

The preliminary heating of the cresylic acid and the calcium acetate together serves to dehydrate the mixture in a measure and also to bring about a molecular intermixing very desirable for the facilitating of the subsequent reactions.

The following will serve as a particular example of the production of the said product: A kilo of commercial gray acetate of lime (finely ground) is heated with a kilo of commercial cresylic acid for from half an hour to an hour. A half kilo of commercial strong sulfuric acid is then added gradually while the mass is stirred. The resulting mixture is of a brownish color (due to the impurities in commercial gray acetate) and after cooling has the described pasty consistency, and is almost if not quite odorless, having none of the characteristic cresol odor. It probably consists of calcium sulfate, the excess of calcium acetate (if any), cresyl acetate and intermediate products, perhaps some cresyl-acetic acid and a little free acetic acid. It may be packaged in tin, without corrosion of the metal.

The preliminary heating of the acetate and cresol may be omitted; in which case the resulting product is somewhat thinner and has a certain minimal amount of unchanged cresol. It is, however, a good paint and varnish remover. In these products, the calcium sulfate and residual calcium acetate, (if any), serve to give body and consistency to what would otherwise be a liquid mass, and therefore render unnecessary the addition of other thickening or colloiding substances. If, after admixture with this product of considerable proportions of liquid solvents, further thickening is desired, other thickeners may be added; for example, casein (which, since it is not a component of ordinary paints or varnishes, does not, when in solution in cresyl acetate, materially diminish the solvent power of the latter for paints and varnishes as would a resin, a nitrocellulose, or like coating materials); or in lieu of casein other thickening proteids may be used.

Other phenols, as for instance, common carbolic acid, may be used in lieu of, or in connection with, the cresol; but I consider the product made by using the cresol alone preferable. Salts of other organic acids than acetic acid, for example, salts of formic acid, butyric acid, etc., may be used instead of the acetate, forming corresponding esters; but calcium acetate is well adapted for the purpose, the resulting product being well adapted for the described use; and calcium acetate has the advantage of being the most convenient commercial salt. Aside from these reasons I consider calcium acetate the best salt to use, when the crude reaction product is to be used as a paint or varnish remover; it is probable that the calcium sulfate formed in the reaction takes a crystalline form particularly suited to give the resulting product the desired consistency.

If desired, the phenol derivatives resulting from the action above described may be extracted from the other substances present in the mixture, by means of alcohol, for example, methyl alcohol; the resulting extract being filtered and heated and the alcohol distilled off, leaving as a residue a thickish liquid, probably consisting mostly of cresyl acetate, though it may also contain some cresyl-acetic acid. This residue is itself an excellent solvent for many purposes and may be used as a paint and varnish remover, having added to it, if desired, a colloiding or thickening agent to give it the desired consistency. And with this product may be incorporated other solvents. In the present case, however, I do not claim this extracted product, this forming part of the subject matter described and claimed in copending application Ser. No. 413,763, filed Feb. 1, 1908.

For many purposes it will be found better to mix with the paste-like product above referred to, one or more other solvents or softeners or disintegrators; for example, some of the well-known volatile solvents. For example, to the product resulting from the specific example given above, may be added one and a half kilos of commercial wood alcohol and a similar quantity of benzol. If the resulting mixture is too thin, more or less wax, say 150 grams, may be dissolved in the benzol before the latter is added to the mixture. The wax may be paraffin, ceresin, Japan wax, beeswax or any other commercial form of wax. Ethyl alcohol, acetone or "methyl acetone" may be used in lieu of the wood alcohol; toluol or xylol in lieu of the benzol. Phenol ethers may be used in lieu of, or in conjunction with, the volatile solvents. Or, if the original crude mixture contains free acetic acid, an addition of casein may be made in amount necessary to take up the free acetic acid, thereby giving additional viscosity; and in some cases I use casein as a thickener. Methyl alcohol being a good solvent for varnish gums and benzol being a solvent for the oxidation products of linseed oil, the original crude mixture may be altered by the addition of either methyl alcohol or benzol or mixtures of alcohol and benzol in varying amounts and proportions to suit the particular paint or varnish or mixture of paint and varnish to be removed. I have also found that the mixture of certain waxes, for example, beeswax, and a phenol mixed up with calcium acetate and treated with sulfuric acid as above described, gives various intermediate products in addition to the products obtained by the treatment of a phenol by itself.

While in a sense the phenol derivatives and the cresyl derivatives may be used interchangeably in paint and varnish removers and solvent preparations such as above described, in general I prefer to use the cresyl compounds, as I consider them more efficient for the purpose; and therefore in the following claims I have claimed specifically the cresyl mixtures and the process of making the same.

An advantageous paint and varnish remover under the present invention may be made by treating a mixture of calcium acetate and cresol containing a little beeswax with sulfuric acid. The resultant thick composition is admixed with a plurality of volatile solvents of differing chemical character, such as wood alcohol and benzol. As these solvents thin the thick composition, the latter advantageously has casein incorporated in it prior to the addition of such solvents. Casein is not only a good thickener but, being a proteid, it diminishes the action of any free acetic acid or cresol upon the hands of the user. Some wax is advantageously admixed with the benzol before incorporating the volatile solvents with the pasty reaction product, wax not only being a good thickener but having the further advantage of exercising a specific retarding action upon the volatilization of certain mixtures of volatile solvents, such as mixtures of wood alcohol and benzol.

Casein and wax are, like the calcium sulfate, excellent thickeners, but each has in addition specific advantages and while they may be separately used, it is advantageous to use both.

What I claim is:—

1. A paint and varnish remover comprising a phenol ester, a mineral salt, a volatile solvent, a proteid and wax.

2. A paint and varnish remover comprising the products resulting from the action of a strong mineral acid upon a mixture of a phenol and a salt of an organic acid.

3. A paint and varnish remover comprising the products resulting from the action of a strong mineral acid upon a mixture of a phenol and a salt of a fatty acid.

4. A paint and varnish remover comprising the products resulting from the action of a strong mineral acid upon a mixture of a phenol and an alkaline earth salt of an organic acid.

5. A paint and varnish remover comprising the products resulting from the action of a strong mineral acid upon a mixture of a phenol and an alkaline earth salt of a fatty acid.

6. A paint and varnish remover comprising the products resulting from the action of a strong mineral acid upon a mixture of a phenol and a salt of acetic acid.

7. A paint and varnish remover comprising the products resulting from the action of a strong mineral acid upon a mixture of a phenol and an alkaline earth salt of acetic acid.

8. A paint and varnish remover comprising the products resulting from the action of a strong mineral acid upon a mixture of a phenol and a calcium salt of an organic acid.

9. A paint and varnish remover comprising the products resulting from the action of a strong mineral acid upon a mixture of a phenol and a calcium salt of a fatty acid.

10. A paint and varnish remover comprising the products resulting from the action of a strong mineral acid upon a mixture of a phenol, a wax, and a salt of an organic acid.

11. A paint and varnish remover comprising the products resulting from the action of a strong mineral acid upon a mixture of a phenol, a wax, and a salt of a fatty acid.

12. A paint and varnish remover comprising a cresyl ester, a mineral salt, and a volatile solvent.

13. A paint and varnish remover comprising a cresyl ester, an alkaline earth salt and a volatile solvent.

14. A paint and varnish remover comprising a phenol ester, a calcium salt, and a volatile solvent.

15. A paint and varnish remover comprising a cresyl ester, a mineral salt, and other paint and varnish solvent.

16. The process of making bodies of solvent character, which comprises mixing a salt of an organic acid with a phenol and decomposing with a stronger mineral acid.

17. The process of making bodies of solvent character, which comprises mixing an alkaline earth salt of an organic acid with a phenol and decomposing with a stronger mineral acid.

18. The process of making bodies of solvent character, which comprises mixing a salt of an organic acid with cresol and decomposing with a stronger mineral acid.

19. The process of making bodies of solvent character, which comprises mixing an alkaline earth salt of an organic acid with cresol and decomposing with a stronger mineral acid.

20. The process of making bodies of solvent character, which comprises mixing a salt of a fatty acid with a phenol and decomposing with a stronger mineral acid.

21. The process of making bodies of solvent character, which comprises mixing an alkaline earth salt of a fatty acid with a phenol and decomposing with a stronger mineral acid.

22. The process of making bodies of solvent character which comprises mixing a salt of a fatty acid with cresol and decomposing with a stronger mineral acid.

23. The process of making bodies of solvent character, which comprises mixing an alkaline earth salt of a fatty acid with cresol and decomposing with a stronger mineral acid.

24. The process of making bodies of solvent character, which comprises mixing an acetate with a phenol and decomposing with a stronger mineral acid.

25. The process of making bodies of solvent character, which comprises mixing an alkaline earth salt with a phenol and decomposing with a stronger mineral acid.

26. The process of making bodies of solvent character, which comprises mixing an acetate with cresol and decomposing with a stronger mineral acid.

27. The process of making bodies of solvent character, which comprises mixing an alkaline earth salt with cresol and decomposing with a stronger mineral acid.

28. The process of making bodies of solvent character, which comprises mixing a calcium salt of an organic acid with phenol and decomposing with a stronger acid.

29. The process of making bodies of solvent character, which comprises mixing a calcium salt of an organic acid with phenol and decomposing with sulfuric acid.

30. The process of making bodies of solvent character, which comprises mixing a salt of an organic acid with phenol and decomposing with sulfuric acid.

31. The process of making a paint and varnish remover which comprises treating a mixture of a phenol, a salt of a fatty acid and a waxy body with a mineral acid, incorporating a proteid in the reaction product and thereafter incorporating a plurality of volatile solvents of different chemical character, one of said solvents carrying a dissolved wax.

In testimony whereof I affix my signature, in the presence of two witnesses.

FRANCIS X. GOVERS.

Witnesses:
  H. M. MARBLE,
  BLANCHE CARSON.